(12) United States Patent
Bahner et al.

(10) Patent No.: US 10,843,119 B2
(45) Date of Patent: Nov. 24, 2020

(54) VALVE ARRANGEMENT AND ADSORBER STATION

(71) Applicant: Linde Aktiengesellschaft, Munich (DE)

(72) Inventors: Valdo Bahner, Munich (DE); Erich Eichhorn, Penzberg (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 258 days.

(21) Appl. No.: 15/763,946

(22) PCT Filed: Sep. 20, 2016

(86) PCT No.: PCT/EP2016/001570
§ 371 (c)(1),
(2) Date: Mar. 28, 2018

(87) PCT Pub. No.: WO2017/054906
PCT Pub. Date: Apr. 6, 2017

(65) Prior Publication Data
US 2018/0280865 A1    Oct. 4, 2018

(30) Foreign Application Priority Data
Sep. 29, 2015 (EP) .................................... 15002796

(51) Int. Cl.
*B01D 53/02* (2006.01)
*B01D 53/04* (2006.01)
(Continued)

(52) U.S. Cl.
CPC ........ *B01D 53/0446* (2013.01); *F16K 11/044* (2013.01); *F16K 11/048* (2013.01);
(Continued)

(58) Field of Classification Search
CPC .......... B01D 2253/102; B01D 2256/10; B01D 2256/12; B01D 2257/504;
(Continued)

(56) References Cited

U.S. PATENT DOCUMENTS 2,182,724 A    12/1939 Hennessy
2,920,653 A *   1/1960 Wolff ................... F16K 11/044
                                                        137/625.43

(Continued)

FOREIGN PATENT DOCUMENTS

| CN | 104061342 A | 9/2014 |
| EP | 0003022 A1 | 7/1979 |
| EP | 2353697 A1 | 8/2011 |

OTHER PUBLICATIONS

International Search Report dated Nov. 28, 2016 issued in corresponding PCT/EP2016/001570 application (3 pages).

(Continued)

*Primary Examiner* — Christopher P Jones
(74) *Attorney, Agent, or Firm* — Millen, White, Zelano & Branigan, P.C.

(57) ABSTRACT

A valve arrangement in particular four-way switch, for an adsorber station of an air separation plant, having a first valve device comprising a first gas inlet/gas outlet, a second valve device, comprising a second gas inlet/gas outlet, and a first connecting piece, which fluidically connects a first housing section of the first device to a second housing section of the second valve device, the first connecting piece has a third gas inlet/gas outlet. A second connecting piece, fluidically connects the first housing section to the second housing section, wherein the second connecting piece has a fourth gas inlet/gas outlet. The valve arrangement is selectively switchable into a first switching state, in which the first gas inlet/gas outlet is fluidically connected to the fourth gas inlet/gas outlet and the second gas inlet/gas outlet is (Continued)

simultaneously fluidically connected to the third gas inlet/gas outlet, or into a second switching state, in which the first gas inlet/gas outlet is fluidically connected to the third gas inlet/gas outlet and the second gas inlet/gas outlet is simultaneously fluidically connected to the fourth gas inlet/gas outlet.

19 Claims, 10 Drawing Sheets

(51) Int. Cl.
 *F16K 11/044* (2006.01)
 *F16K 11/048* (2006.01)
 *F16K 11/20* (2006.01)
(52) U.S. Cl.
 CPC ........ *F16K 11/20* (2013.01); *B01D 2253/108* (2013.01); *B01D 2256/10* (2013.01); *B01D 2256/12* (2013.01); *B01D 2257/504* (2013.01); *B01D 2257/702* (2013.01); *B01D 2257/80* (2013.01); *B01D 2259/402* (2013.01); *B01D 2259/40003* (2013.01); *B01D 2259/40086* (2013.01)
(58) Field of Classification Search
 CPC .......... B01D 2257/702; B01D 2257/80; B01D 2259/40003; B01D 2259/40086; B01D 2259/402; B01D 53/0446; F16K 11/044; F16K 11/048; F16K 11/20
 See application file for complete search history.

(56) References Cited

U.S. PATENT DOCUMENTS

| | | | | |
|---|---|---|---|---|
| 3,280,536 | A | * 10/1966 | Berlin | A61G 10/04 95/105 |
| 4,162,146 | A | 7/1979 | Seibert | |
| 4,312,641 | A | * 1/1982 | Verrando | B01J 20/3441 95/105 |
| 4,635,681 | A | 1/1987 | Boldish | |
| 5,917,135 | A | * 6/1999 | Michaels | B01D 53/047 95/101 |
| 6,152,178 | A | * 11/2000 | Hirota | F16K 11/048 137/625.43 |
| 7,568,355 | B2 | * 8/2009 | Yabu | F24F 3/1411 62/271 |
| 9,987,581 | B2 | * 6/2018 | Leconte | B01D 46/446 |
| 2003/0000586 | A1 | * 1/2003 | Hirota | F16K 11/044 137/625.43 |
| 2007/0034266 | A1 | 2/2007 | Wang | |
| 2009/0255403 | A1 | * 10/2009 | Uchiyama | B01D 53/047 96/2 |
| 2011/0315140 | A1 | * 12/2011 | Shuman | A61M 16/10 128/204.23 |

OTHER PUBLICATIONS

English Abstract of EP 2353697 A1 published Aug. 10, 2011.
English Abstract of CN 104061342 A published Sep. 24, 2014.

* cited by examiner

VALVE ARRANGEMENT AND ADSORBER STATION

The invention relates to a valve arrangement, in particular a four-way switch, for an adsorber station of an air separation plant, and to an adsorber station for an air separation plant having a valve arrangement of said type.

Cryogenic air separation is a technical process for gas separation in which gas mixtures, such as air, and individual atmospheric gases, such as oxygen, nitrogen and noble gases, are liquefied in large quantities. The fresh air or feed air supplied to a cryogenic air separation plant must have water vapour, carbon dioxide and hydrocarbons removed before the cooling process, in order to avoid solids deposits in the cryogenic part of the cryogenic air separation plant. These constituents of the fresh air are normally removed by adsorption before the point of entry into a main heat exchanger of the cryogenic air separation plant. For this purpose, use is commonly made of adsorbers filled with synthetic zeolites, so-called molecular sieves.

For reliable operation of the molecular sieves or generally of adsorbers, it is necessary for these to be regenerated from time to time using a suitable regeneration gas. For uninterrupted operation, at least two adsorbers are therefore required, of which one is loaded with the substances for removal while the other is regenerated.

The pipework of the at least two adsorbers has, for each adsorber, a supply line and a discharge line for the product gas for purification, and a supply line and a discharge line for the regeneration gas. Furthermore, corresponding valves and flaps must be arranged in the various pipelines in order to be able to switch over the two adsorbers between the adsorption phase and regeneration phase.

EP 1 314 469 A1 describes an adsorber station having a first adsorber and a second adsorber, wherein the first and the second adsorber each have a product gas supply line equipped with a product gas supply line valve, a product gas discharge line equipped with a product gas discharge line valve, a regeneration gas supply line equipped with a regeneration gas supply line valve, and a regeneration gas discharge line equipped with a regeneration gas discharge line valve.

Against this background, it is the object of the present invention to provide an improved valve arrangement for an adsorber station of an air separation plant.

Accordingly, a valve arrangement, in particular a four-way switch, for an adsorber station of an air separation plant is proposed. The valve arrangement comprises a first valve device which comprises a first gas inlet/gas outlet, a second valve device, which comprises a second gas inlet/gas outlet, a first connecting piece, which fluidically connects a first housing section of the first device to a second housing section of the second valve device, wherein the valve devices or the housing sections are arranged parallel to one another and spaced apart from one another, wherein the first connecting piece has a third gas inlet/gas outlet, and a second connecting piece, which fluidically connects the first housing section of the first device to the second housing section of the second valve device, wherein the second connecting piece has a fourth gas inlet/gas outlet, wherein the valve arrangement is selectively switchable into a first switching state, in which the first gas inlet/gas outlet is fluidically connected to the fourth gas inlet/gas outlet and the second gas inlet/gas outlet is simultaneously fluidically connected to the third gas inlet/gas outlet, or into a second switching state, in which the first gas inlet/gas outlet is fluidically connected to the third gas inlet/gas outlet and the second gas inlet/gas outlet is simultaneously fluidically connected to the fourth gas inlet/gas outlet.

The valve devices and housing sections that are arranged parallel to one another and spaced apart from one another permit a flexible switchover of the gas flows, which are perpendicular to one another. The housing sections and the connecting pieces form a valve housing of the valve arrangement. In particular, the adsorber station may have the valve device. By means of the adsorber station, compressed fresh air can be purified of substances such as carbon monoxide, water or hydrocarbons. The fresh air can also be referred to as feed gas or feed air. Downstream of the adsorber station, the purified fresh air, which can then also be referred to as product gas, is subjected to cryogenic separation. For the regeneration of the adsorber, use may be made of a regeneration gas, in particular a nitrogen-rich or oxygen-rich dry gas mixture originating from the cryogenic separation. By means of the valve arrangements, it is possible for adsorbers of the adsorber station to be switched between an adsorption phase and the regeneration phase without the inflow of fresh air to the adsorber station being interrupted. This means that the fresh air can be supplied continuously to the adsorber station even during the switchover of the adsorbers. Owing to the use of the switchable valve arrangements, the adsorber station can be constructed with considerably fewer lines, flaps and valves in relation to known adsorber stations. Owing to the reduced number of flaps and valves and owing to the simplified pipework, a cost saving is realized. Furthermore, the actuation for the switchover of the adsorbers is simplified owing to the relatively low number of valves and flaps.

In one embodiment, the valve arrangement is switchable into a third switching state, in which the first gas inlet/gas outlet, the second gas inlet/gas outlet, the third gas inlet/gas outlet and the fourth gas inlet/gas outlet are simultaneously fluidically connected to one another.

During the switchover of the adsorbers from the adsorption phase into the regeneration phase, the valve arrangement is switched into the third switching state. In the third switching state, both adsorbers are charged with fresh air.

In a further embodiment, the valve arrangement comprises a pressure build-up valve which is arranged between the first connecting piece and the second connecting piece and which serves for pressure equalization between the connecting pieces.

By means of the pressure build-up valve, an inadmissible pressure shock upon the switchover from the regeneration phase into the adsorption phase is prevented. Damage to the adsorber station is hereby prevented. The pressure build-up valve may be integrated into the valve housing of the valve arrangement.

In a further embodiment, the first valve device and the second valve device are switchable simultaneously, such that the first valve device and the second device are simultaneously switchable back and forth between the first switching state and the second switching state.

The valve devices are switchable by means of a drive device, for example a linear motor. For example, each valve device may be assigned a drive device.

In a further embodiment, the first valve device comprises a first valve seat, a second valve seat and a first valve body arranged between the first valve seat and the second valve seat, and wherein the first valve body bears against the first valve seat in the first switching state and against the second valve seat in the second switching state.

The valve body is operatively connected to an actuating rod. The actuating rod may be led out of the first housing section via a pipe section. The actuating rod is coupled to the drive device.

In a further embodiment, the first gas inlet/gas outlet is arranged between the first valve seat and the second valve seat.

The first gas inlet/gas outlet is preferably positioned opposite and between the connecting pieces.

In a further embodiment, the first valve seat and the second valve seat are ring-shaped, and the first valve body is disk-shaped.

The first valve body may also be referred to as first valve disk. The valve seats preferably fully encircle the first housing section at the inner side.

In a further embodiment, the first valve body is, with the aid of fresh air supplied by the valve arrangement, pressable against the first valve seat in the first switching state and against the second valve seat in the second switching state.

Here, the pressure of the fresh air may act counter to the pressure of the regeneration gas. The pressure of the fresh air is higher than the pressure of the regeneration gas. By virtue of the fact that the fresh air presses the first valve body against the respective valve seat, the sealing action is intensified, and the drive device does not have to operate counter to the pressure of the fresh air. In this way, the drive device can be dimensioned to be smaller. This provides additional safety with respect to an inadmissible pressure shock.

In a further embodiment, the first valve body is axially displaceable in the first housing section along a longitudinal direction thereof.

This yields a particularly simple construction of the first valve device, because a rotational movement of the first valve body can be omitted. Furthermore, in this way, a high degree of wear resistance of the first valve body and of the valve seats is achieved, because the first valve body is moved linearly towards the valve seats and away from these.

In a further embodiment, the second valve device comprises a third valve seat, a fourth valve seat, a second valve body and a third valve body, wherein the third valve seat and the fourth valve seat are arranged between the second valve body and the third valve body, wherein the third valve body bears against the fourth valve seat in the first switching state and wherein the second valve body bears against the fourth valve seat in the second switching state.

In particular, the third valve body does not bear against any of the valve seats in the second switching state, and the second valve body does not bear against any of the valve seats in the first switching state. The valve bodies are preferably coupled to a common actuating rod. The actuating rod may be operatively connected to a drive device.

In a further embodiment, the second gas inlet/gas outlet is arranged between the third valve seat and the fourth valve seat.

The second gas inlet/gas outlet is preferably positioned opposite and between the connecting pieces.

In a further embodiment, the third valve seat and the fourth valve seat are ring-shaped, and the second valve body and the third valve body are disk-shaped.

The second valve body and the third valve body may be referred to as second valve disk and third valve disk. The valve seats preferably fully encircle the second housing section at the inner side. The valve seats may be manufactured from a suitable, in particular elastically deformable, material. The material may be a metallic material, rubber or a plastics material.

In a further embodiment, the third valve body is, with the aid of fresh air supplied by the valve arrangement, pressable against the fourth valve seat in the first switching state, wherein the second valve body is pressable against the third valve seat in the second switching state.

By virtue of the fact that the fresh air presses the valve bodies against the respective valve seat, the sealing action is intensified, and the drive device does not have to operate counter to the pressure of the fresh air. In this way, the drive device can be dimensioned to be smaller.

In a further embodiment, the second valve body and the third valve body are jointly axially displaceable in the second housing section along a longitudinal direction thereof.

This yields a particularly simple construction of the second valve device, because a rotational movement of the valve bodies can be omitted. Furthermore, in this way, a high degree of wear resistance of the valve bodies and of the valve seats is achieved, because the valve bodies are moved linearly towards the valve seats and away from these.

An adsorber station for an air separation plant is also proposed. The adsorber station comprises a first adsorber, a second adsorber and at least one valve arrangement of said type, wherein the first adsorber and the second adsorber can be switched over between an adsorption phase and a regeneration phase by means of the at least one valve arrangement.

The adsorber station may also be referred to as molecular sieve station, and the adsorbers may be referred to as molecular sieve adsorbers. The adsorber station is designed to remove substances such as water, carbon dioxide, hydrocarbons or the like from fresh air that is subjected to an air separation process. The adsorber station preferably has two such valve arrangements. The adsorber station furthermore comprises lines that fluidically connect the valve arrangements to the adsorbers. Furthermore, the adsorber station comprises a pressure build-up valve and a pressure dissipation valve for preventing inadmissible pressure shocks upon the switchover between the adsorption phase and the regeneration phase and vice versa, and also multiple flaps and a heating device. By means of the heating device, the regeneration gas can be heated for a baking phase. The baking phase is part of the regeneration phase.

Further possible implementations of the valve arrangement and/or of the adsorber station also include combinations of features or embodiments described above or below with regard to the exemplary embodiments that have not been mentioned explicitly. A person skilled in the art will also add individual aspects as improvements or supplementations to the respective basic form of the valve arrangement and/or of the adsorber station.

Further advantageous design embodiments and aspects of the valve arrangement and/or of the adsorber station are the subject matter of the dependent claims and of the exemplary embodiments of the valve arrangement and/or of the adsorber station described below. The valve arrangement and/or the adsorber station will be explained in more detail below with reference to the appended figures.

In the figures, elements that are the same or have the same function have been given the same reference signs, unless stated otherwise.

Figure 1:
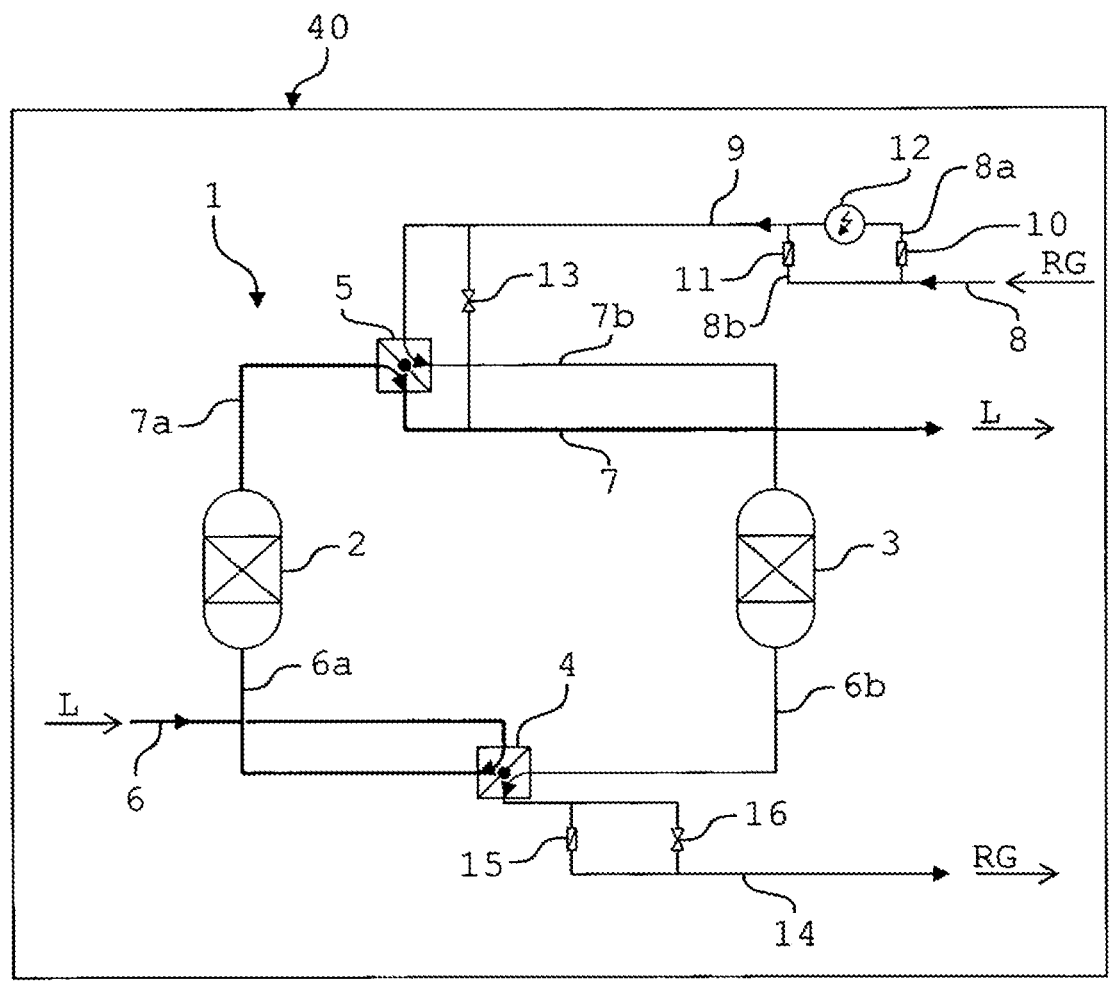
FIG. 1 shows a schematic view of an embodiment of an adsorber station for an air separation plant.

FIG. 1 shows a schematic view of an embodiment of a molecular sieve station or adsorber station 1 for a cryogenic air separation plant or air separation plant 40. The air separation plant 40 may comprise the adsorber station 1. By means of the adsorber station 1, carbon dioxide, hydrocarbons and water vapor can be removed from fresh air L for treatment. After the removal of the abovementioned substances, the fresh air L is fed for cryogenic separation. The adsorber station 1 comprises two switchable molecular sieve adsorbers or adsorbers 2, 3 which can be switched over, and which can be alternately loaded with the substances for removal or regenerated. In FIG. 1, the adsorber 2 is in an adsorption phase, and the adsorber 3 is in a regeneration phase. The adsorption phase may also be referred to as loading phase.

The adsorber station comprises two valve arrangements 4, 5, which may also be referred to as four-way switches. The valve arrangements 4, 5 are preferably structurally identical. The valve arrangements 4, 5 can be moved into different switching positions. The adsorbers 2, 3 can be switched over by means of the valve arrangements 4, 5 cyclically, preferably approximately every four hours, wherein the time duration is determined by the fill volume of the adsorbers 2, 3. The supply of the fresh air L is in this case performed continuously.

Via a line 6, the compressed fresh air L—the compression of the fresh air L is not shown in FIG. 1—is supplied to a first valve arrangement 4. At the first valve arrangement 4, the line 6 splits into two lines 6a and 6b, which fluidically connect the first valve arrangement 4 to a first adsorber 2 and to a second adsorber 3 respectively. The first valve arrangement 4 has been switched such that the fresh air L for treatment, which can also be referred to as feed gas, is supplied to the first adsorber 2. The fresh air stream is denoted in FIG. 1 by thick lines.

Downstream of the adsorbers 2, 3, a second valve arrangement 5 is provided, which is fluidically connected to the adsorbers 2, 3 by means of lines 7a, 7b. Here, the line 7a is assigned to the first adsorber 2, and the line 7b is assigned to the second adsorber 3. The treated fresh air L, which can also be referred to as product gas, is drawn off via a line 7. The second valve arrangement 5 has in this case been switched such that the line 7a is fluidically connected to the line 7. The valve arrangements 4, 5 have thus been switched such that the fresh air L is conducted through the adsorber 2, in which the substances for removal are extracted from the fresh air L. The adsorber 2 is thus in the adsorption phase.

Owing to the heat of adsorption, the fresh air L that is drawn off via the line 7 is at an elevated temperature in relation to the inlet temperature.

Meanwhile, the adsorber 3 is in the regeneration phase. Here, a regeneration gas RG is supplied to the adsorber 3. The regeneration gas stream is denoted in FIG. 1 by thin lines. The regeneration gas RG is for example a nitrogen-rich or oxygen-rich dry gas mixture originating from the cryogenic separation. The regeneration gas RG is supplied via a line 8. The line 8 splits into two lines 8a, 8b. The lines 8a, 8b connect the line 8 to a line 9, which in turn is fluidically connected to the second valve arrangement 5. The line 8a has a valve or a flap 10. The line 8b likewise has a valve or a flap 11. Furthermore, a heater or a heating device 12 is provided between the lines 8a, 8b. The flaps 10, 11 can be switched such that the regeneration gas RG is conducted via the line 8a through the heating device 12 in order to be heated, or is conducted via the line 8b past the heating device 12. The flaps 10, 11 may in this case be replaced by a two-way switch as per FIG. 10.

The regeneration phase normally has a baking phase. The duration of the baking phase amounts to approximately ⅓ of the regeneration phase. During the baking phase, with the flap 10 open and the flap 11 closed, the regeneration gas RG is conducted via the heating device 12 and heated to a temperature of approximately 100 to 200° C. After the regeneration phase, the second adsorber 3 is cooled to operating temperature again. For this purpose, the flap 10 is closed and the flap 11 is opened. The cold regeneration gas RG from the low-temperature separation then flows directly into the second adsorber 3, and brings the latter to the required operating temperature.

While the second adsorber 3 is in the regeneration phase, the second valve arrangement 5 is switched such that the line 9 is fluidically connected to the line 7b. The regeneration gas RG is thus supplied via the line 9, the second valve arrangement 5 and the line 7b to the second adsorber 3. Between the line 9 and the line 7, there is provided a pressure build-up valve 13, the function of which will be discussed in more detail further below. The first valve arrangement 4 has been switched such that the line 6b is fluidically connected to a line 14 via which the regeneration gas RG is drawn off from the adsorber station 1. The line 14 furthermore comprises a valve or a flap 15 and a pressure dissipation valve 16 connected in parallel with respect to the flap 15. The function of the flap 15 and of the pressure dissipation valve 16 will be discussed further below.

By means of a switchover of the valve arrangements 4, 5, the first adsorber 2 can be placed into the regeneration phase, and the second adsorber 3 can be placed into the adsorption phase. This is performed without an interruption of the supply of fresh air. This means that fresh air L is supplied to the adsorber station 1 continuously, even during the switchover of the adsorbers 2, 3 from the regeneration phase into the adsorption phase and vice versa. The pressure in the adsorbers 2, 3 is considerably higher during the adsorption phase than in the regeneration phase. To avoid pressure shocks, it is therefore the case that, before the regeneration gas RG is introduced into the second adsorber 3, the pressure in the latter is reduced by means of the pressure dissipation valve 16. Before the switchover of the two pressure adsorbers 2, 3, the pressure in the second adsorber 3 is slowly increased to operating pressure by means of the pressure build-up valve 13 in order to avoid pressure shocks upon the switchover.

Figure 2:
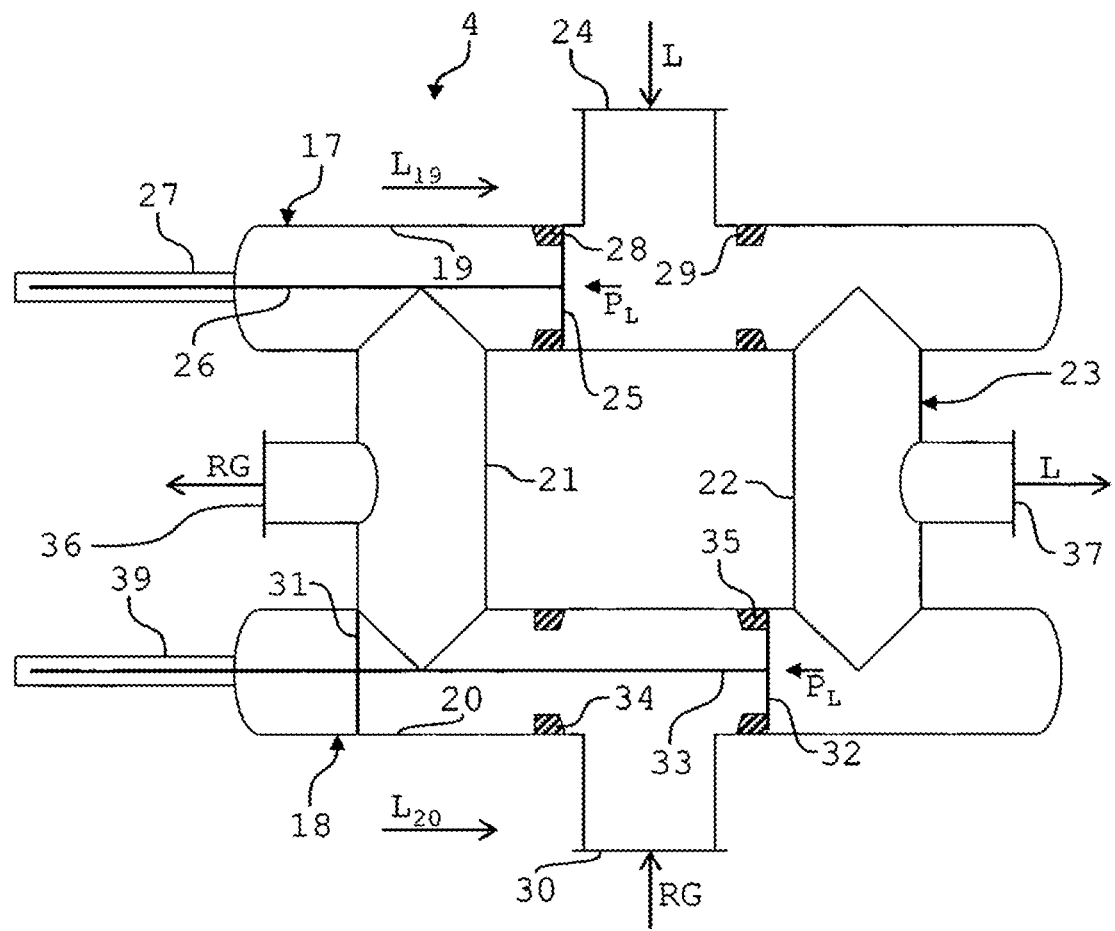
FIG. 2 shows a schematic sectional view of a valve arrangement for the adsorber station as per FIG. 1.
Figure 3:
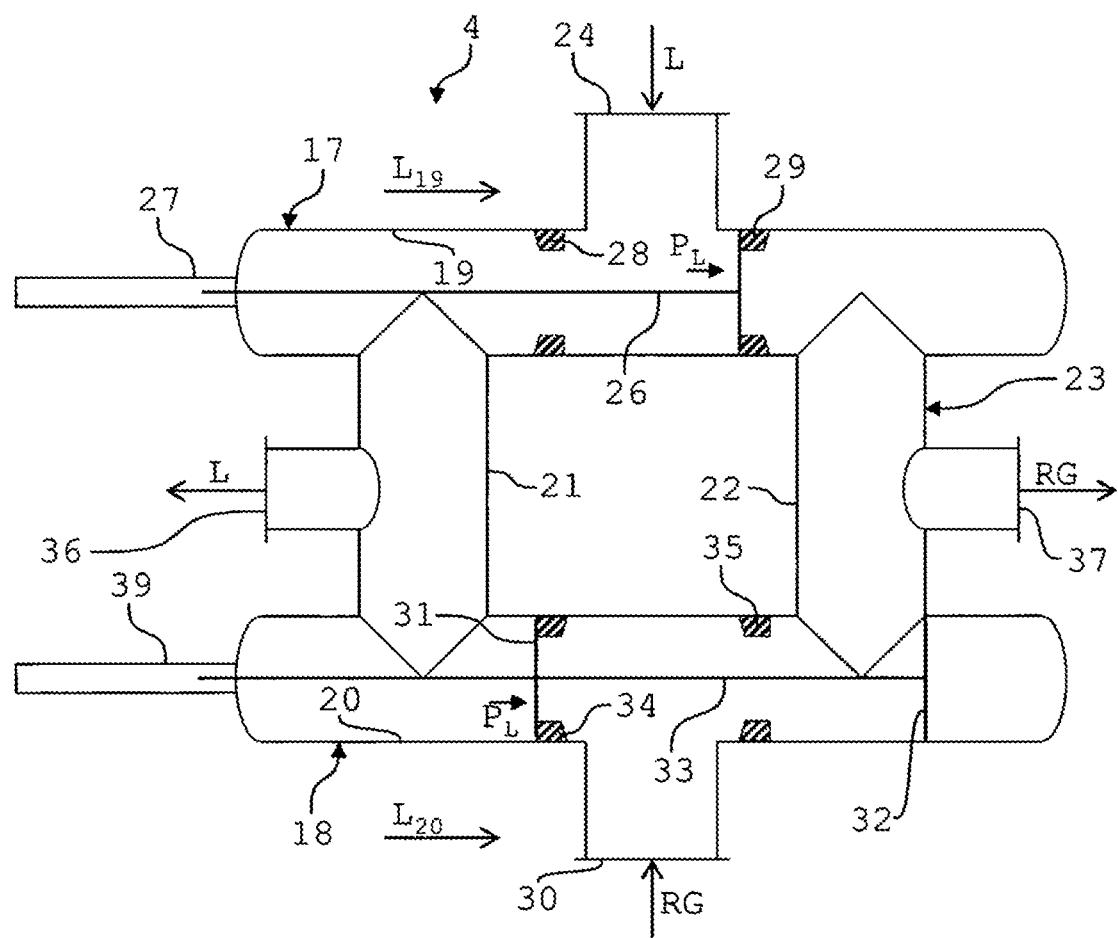
FIG. 3 shows a further schematic sectional view of the valve arrangement as per FIG. 2.

FIG. 2 shows a schematic view of an embodiment of the valve arrangement 4 in a first switching state. FIG. 3 shows the valve arrangement 4 in a second switching state. Since the valve arrangements 4, 5 are substantially structurally identical, only the valve arrangement 4 will be referred to below.

The valve arrangement 4 comprises a first valve device 17 and a second valve device 18. The first valve device 17 has a tubular first housing section 19, and the second valve device 18 has a tubular second housing section 20. The valve devices 17, 18 or the housing sections 19, 20 are arranged parallel to one another and spaced apart from one another. The first housing section 19 is fluidically connected to the second housing section 20 by means of two tubular connecting pieces 21, 22, specifically a first connecting piece 21 and a second connecting piece 22. The connecting pieces 21, 22 may for example be screwed or welded to the housing sections 19, 20. The connecting pieces 21, 22 are positioned so as to be spaced apart from one another and parallel to one another. The connecting pieces 21, 22 are arranged perpendicular to the housing sections 19, 20, such that the connecting pieces 21, 22, together with the housing sections 19, 20, form a rectangular valve housing 23 of the valve arrangement 4.

On the first housing section 19 of the first valve device 17, there is provided a first gas inlet/gas outlet 24, to which for example the line 7 or 6 (FIG. 1) is connectable. This means that the fresh air L flows into or out of the first gas inlet/gas outlet 24 in a manner dependent on the positioning of the valve arrangement 4 in the adsorber station 1, and independently of the switching state of the valve arrangement 4. A disk-shaped first valve body 25 is provided in the first housing section 19. The first valve body 25 may also be referred to as first valve disk. The first valve body 25 is linearly displaceable in a longitudinal direction $L_{19}$ of the first housing section 19. The first valve body 25 is coupled to an actuating rod 26. The actuating rod 26 is led out of the first housing section 19 via a pipe section 27 provided at the end side on the first housing section 19. The actuating rod 26 may be operatively connected to a drive device, for example to a linear motor or to a pneumatic drive. By means of the drive device, the first valve body 25 can be displaced linearly in the first housing section 19.

The first valve device 17 furthermore comprises a first valve seat 28 and a second valve seat 29. The first valve body 25 is arranged between the valve seats 28, 29. Furthermore, the first gas inlet/gas outlet 24 is also arranged between the valve seats 28, 29. The valve seats 28, 29 are ring-shaped, and fully encircle the first housing section 19 at the inside. In the first switching state of the valve arrangement 4 as shown in FIG. 2, the first valve body 25 bears against the first valve seat 28, whereby the fluidic connection between the first gas inlet/gas outlet 24 and the first connecting piece 21 is shut off. In the second switching state of the valve arrangement 4 as shown in FIG. 3, the first valve body 25 bears against the second valve seat 29, whereby the fluidic connection between the first gas inlet/gas outlet 24 and the second connecting piece 22 is shut off. In both switching states, the first valve body 25 is pressed against the respective valve seat 28, 29 by a pressure $P_L$ of the fresh air L, whereby the sealing action is improved. The pressure $P_L$ of the fresh air L is considerably higher than a pressure of the regeneration gas RG.

On the second housing section 20 of the second valve device 18, there is provided a second gas inlet/gas outlet 30, to which for example the line 9 or 14 (FIG. 1) is connectable. This means that the regeneration gas RG flows into or out of the second gas inlet/gas outlet 30 in a manner dependent on the positioning of the valve arrangement 4 in the adsorber station 1, and independently of the switching state of the valve arrangement 4. A disk-shaped second valve body 31 is provided in the second housing section 20. The second valve body 31 may also be referred to as second valve disk. Furthermore, a disk-shaped third valve body 32 is provided in the second housing section 20. The third valve body 32 may also be referred to as third valve disk. The valve body 31, 32 are linearly displaceable together in a longitudinal direction $L_{20}$ of the first housing section 20. The longitudinal direction $L_{20}$ is oriented parallel to the longitudinal direction $L_{19}$.

The valve bodies 31, 32 are coupled to an actuating rod 33. Here, the valve body 31, 32 are arranged spaced apart from one another on the actuating rod 33. The actuating rod 33 is led out of the second housing section 20 via a pipe section 39 provided at the end side on the second housing section 20. The actuating rod 33 may be operatively connected to a drive device, for example to a linear motor or to a pneumatic drive. By means of the drive device, the second valve body 31 and the third valve body 32 can be jointly displaced linearly in the second housing section 20.

The second valve device 18 furthermore comprises a third valve seat 34 and a fourth valve seat 35. The second gas inlet/gas outlet 30 is arranged between the valve seats 34, 35. The valve seats 34, 35 are ring-shaped, and fully encircle the second housing section 20 at the inside. The valve body 31, 32 are arranged not between the valve seats 34, 35 but outside the latter. In the orientation of FIGS. 2 and 3, the second valve body 31 is provided on the left adjacent to the third valve seat 34, and the third valve body 32 is provided on the right adjacent to the fourth valve seat 35. In the first switching state of the valve arrangement 4 as shown in FIG. 2, the third valve body 32 bears against the fourth valve seat 35, whereby the fluidic connection between the second gas inlet/gas outlet 30 and the second connecting piece 22 is shut off. In the second switching state of the valve arrangement 4 as shown in FIG. 3, the second valve body 31 bears against the third valve seat 34, whereby the fluidic connection between the second gas inlet/gas outlet 30 and the first connecting piece 21 is shut off. In the two switching states, in each case, the third valve body 32 is pressed against the fourth valve seat 35 by the pressure $P_L$, and the second valve body 31 is pressed against the third valve seat 34, whereby the sealing action is improved.

The first connecting piece 21 comprises a third gas inlet/gas outlet 36, to which the line 6a or 7a (FIG. 1) is connectable. This means that the fresh air L or the regeneration gas RG flows into or out of the third gas inlet/gas outlet 36 in a manner dependent on the positioning of the valve arrangement 4 in the adsorber station 1, and in a manner dependent on the switching state of the valve arrangement 4. The second connecting piece 22 comprises a fourth gas inlet/gas outlet 37, to which the line 6b or 7b (FIG. 1) is connectable. This means that the fresh air L or the regeneration gas RG flows into or out of the fourth gas inlet/gas outlet 37 in a manner dependent on the positioning of the valve arrangement 4 in the adsorber station 1, and in a manner dependent on the switching state of the valve arrangement 4.

During the operation of the adsorber station 1 (FIG. 1), the valve arrangement 4 is selectively switchable into the first switching state, in which the first gas inlet/gas outlet 24 is fluidically connected to the fourth gas inlet/gas outlet 37 and the second gas inlet/gas outlet 30 is simultaneously fluidically connected to the third gas inlet/gas outlet 36, or into the second switching state, in which the first gas inlet/gas outlet 24 is fluidically connected to the third gas inlet/gas outlet 36 and the second gas inlet/gas outlet 30 is simultaneously fluidically connected to the fourth gas inlet/gas outlet 37. The valve arrangement 4 is furthermore switchable into a third switching state, as will be discussed in more detail below.

FIGS. 4 to 9 each show schematic sectional views of the adsorber station 1 as per FIG. 1. The functioning of the adsorber station 1 and of the valve arrangements 4, 5 will be discussed in more detail below on the basis of FIGS. 4 to 9.

The valve arrangements 4, 5 may each comprise a manhole or a maintenance opening 38. The maintenance opening 38 can be closed by means of a removable cover. The maintenance opening 38 may be provided on the first valve device 17 and/or on the second valve device 18. Furthermore, the pressure build-up valve 13 may be integrated into the second valve arrangement 5. By means of the pressure build-up valve 13, the first connecting piece 21 is fluidically connected to the second connecting piece 22 in order to permit a pressure equalization between these.

Figure 4:
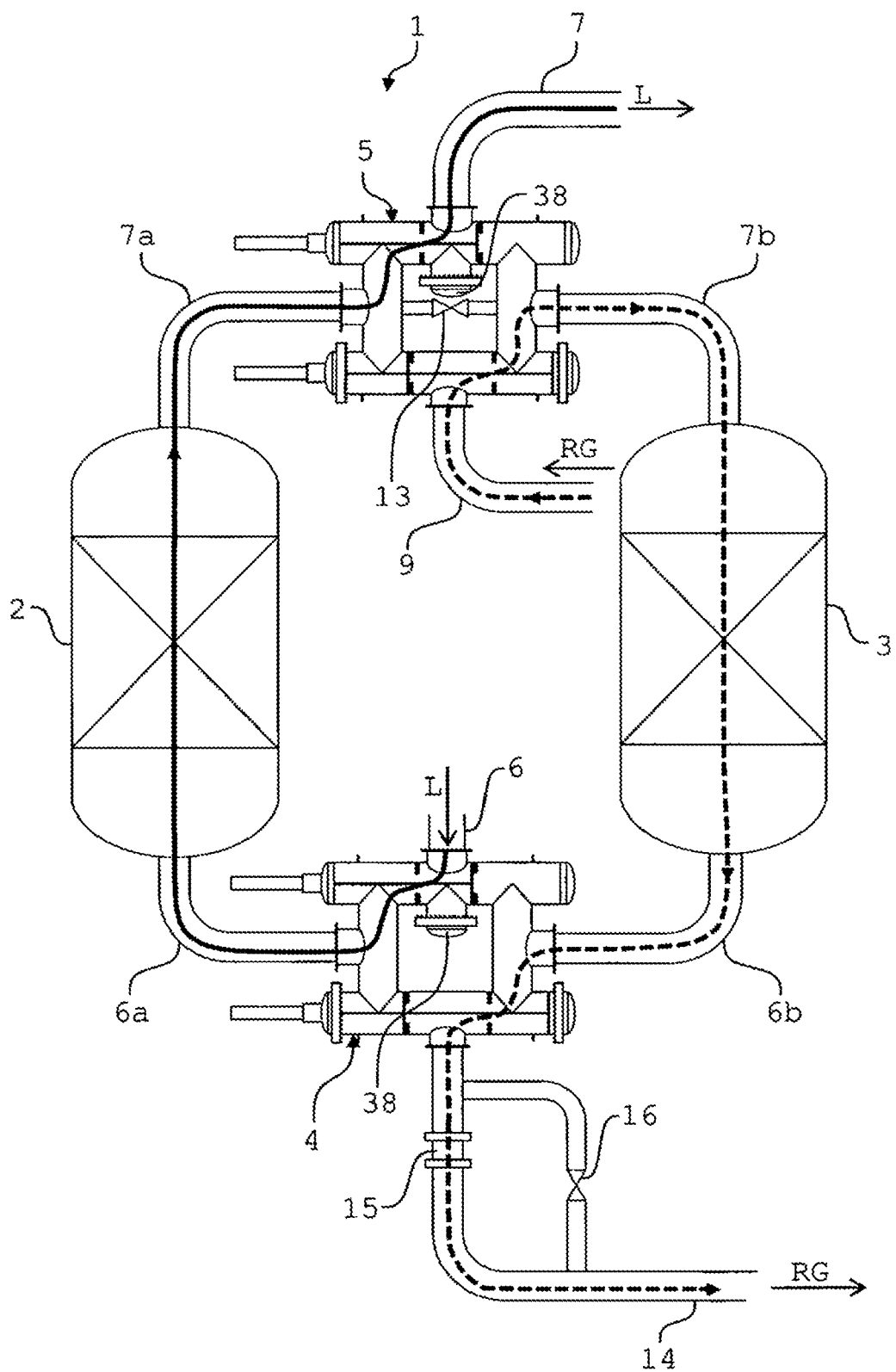
FIG. 4 shows a schematic sectional view of the adsorber station as per FIG. 1.

In FIG. 4, the first adsorber 2 is in the adsorption phase, and the second adsorber 3 is in the regeneration phase. The valve arrangements 4, 5 have both been switched into the second switching state, in which the first gas inlet/gas outlet 24 is fluidically connected to the third gas inlet/gas outlet 36 and, at the same time, the second gas inlet/gas outlet 30 is connected to the fourth gas inlet/gas outlet 37. The pressure build-up valve 13 is closed. The flaps 10, 11 and 15 are open, and the pressure dissipation valve 16 is closed or open. The compressed fresh air L is supplied to the first adsorber 2 via the lines 6 and 6a, and the purified fresh air L is drawn off via the lines 7a and 7. The regeneration gas RG is supplied to the second adsorber 3 via the lines 9 and 7b, and is drawn off via the lines 6b and 14. The fresh air L is at a considerably higher pressure than the regeneration gas RG.

Figure 5:
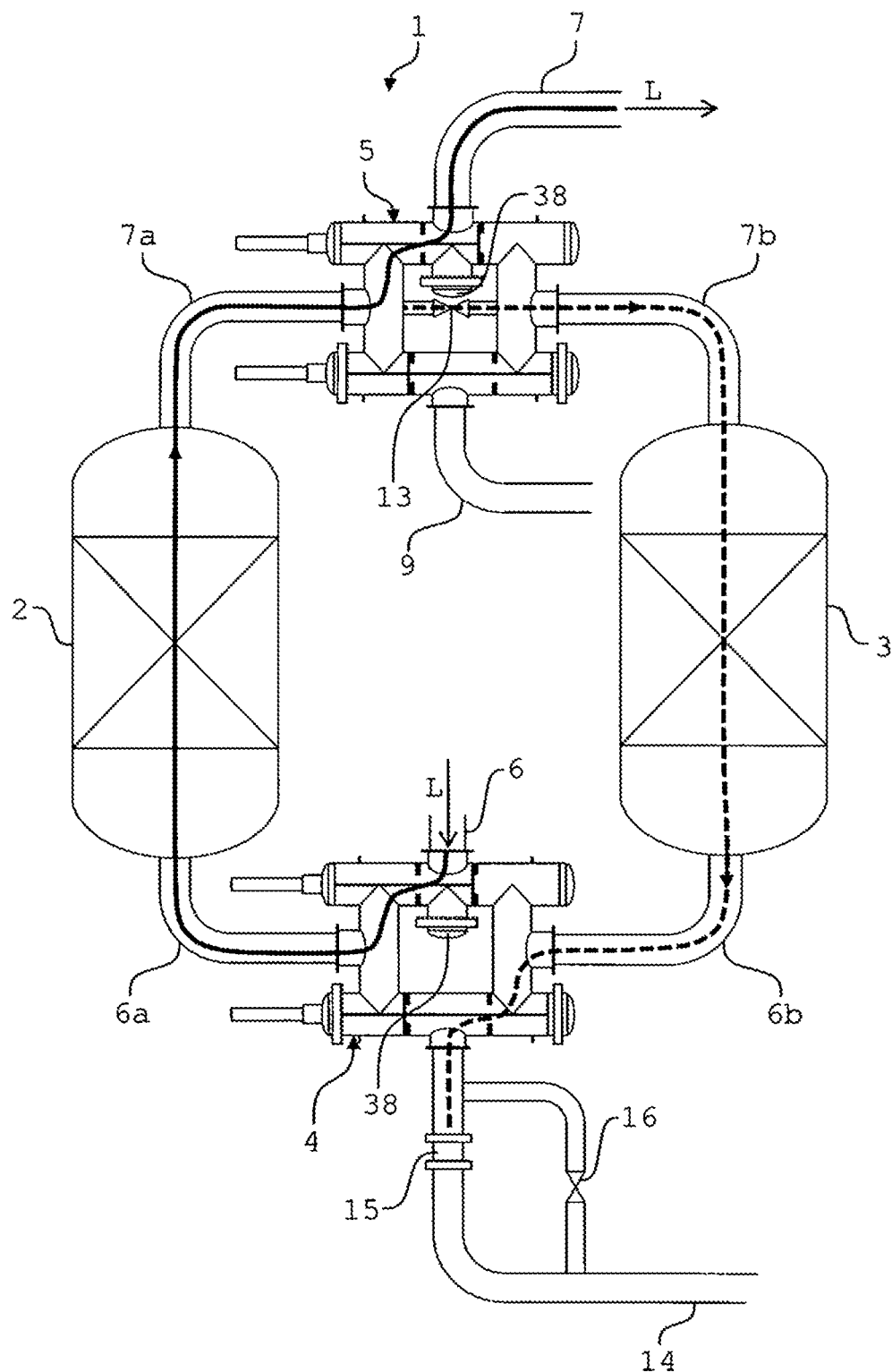
FIG. 5 shows a further schematic sectional view of the adsorber station as per FIG. 1.

FIG. 5 shows the adsorber station 1 before the switchover of the adsorbers 2, 3. The two valve arrangements 4, 5 are still in the second switching state. The flaps 10, 11 are closed, such that no further regeneration gas RG is supplied to the second adsorber 3. The flap 15 and the pressure dissipation valve 16 are closed. The pressure build-up valve 13 is opened, such that the pressure in the second adsorber 3 increases. In this way, an inadmissible pressure shock upon the switchover of the adsorbers 2, 3 is avoided.

Figure 6:
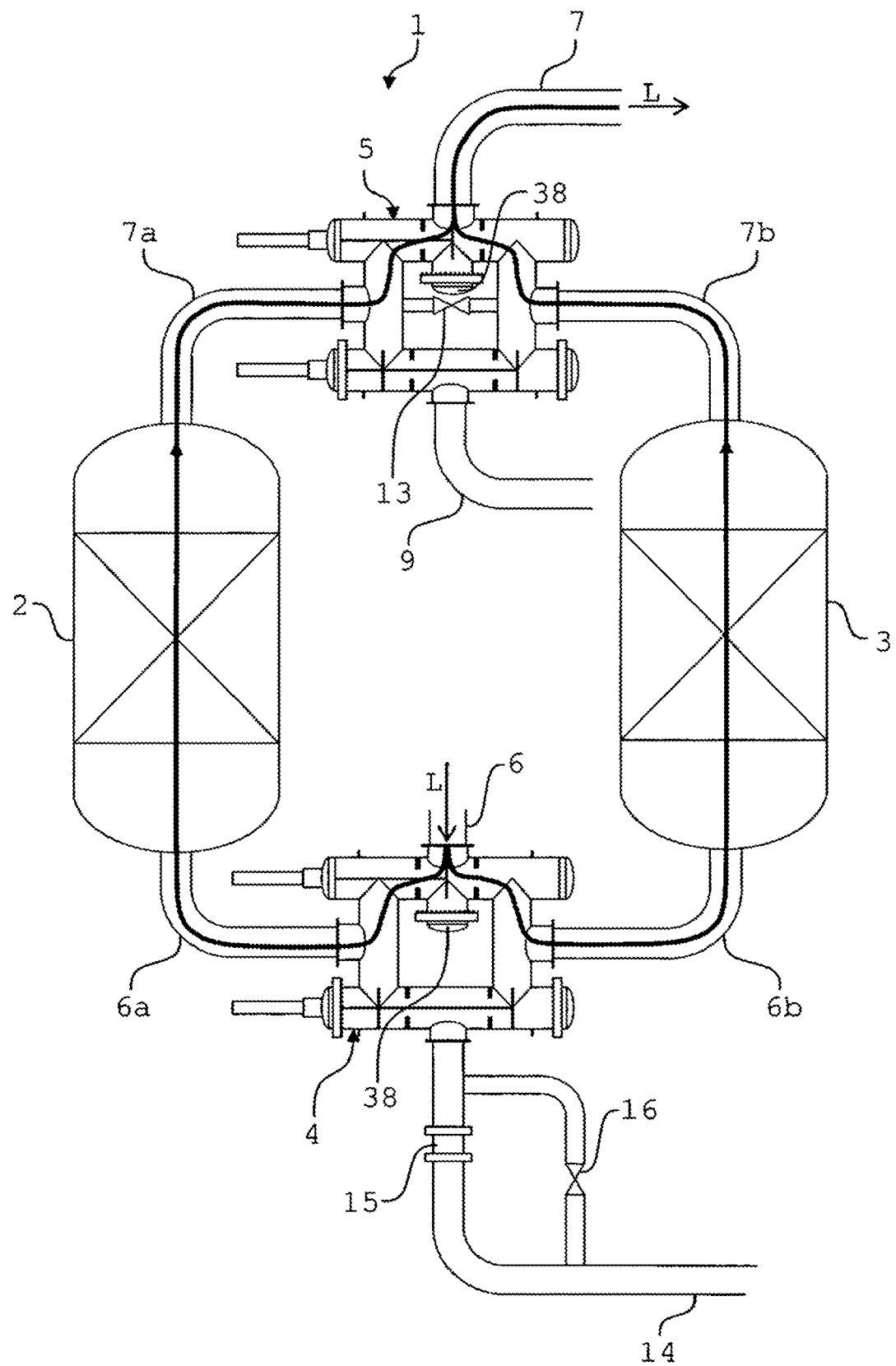
FIG. 6 shows a further schematic sectional view of the adsorber station as per FIG. 1.

FIG. 6 shows the adsorber station 1 during the switchover of the adsorbers 2, 3. The two valve arrangements 4, 5 are in a third switching state. In the third switching state, all gas inlets/gas outlets 24, 30, 36, 37 are fluidically connected to one another. The pressure build-up valve 13, the flaps 10, 11 and 15 and the pressure dissipation valve 16 are closed. The fresh air L is supplied via the line 6 and the lines 6a, 6b to both adsorbers 2, 3 simultaneously, and is drawn off via the lines 7a, 7b and 7.

Figure 7:
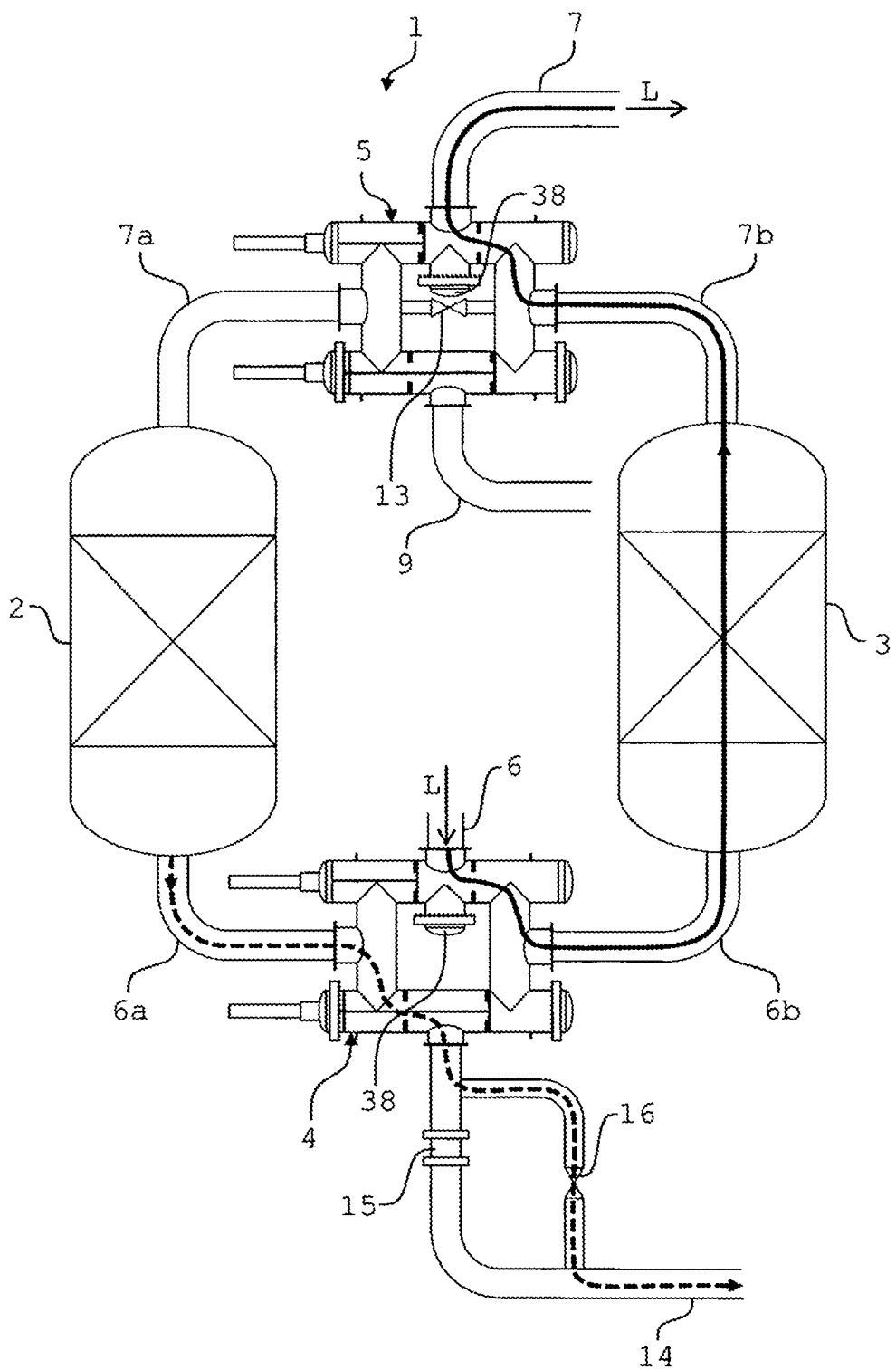
FIG. 7 shows a further schematic sectional view of the adsorber station as per FIG. 1.

FIG. 7 shows the adsorber station 1 immediately after the switchover of the adsorbers 2, 3, wherein a dissipation of pressure is being performed in the first adsorber 2. Both valve arrangements 4, 5 have been switched into the first switching state, in which the first gas inlet/gas outlet 24 is fluidically connected to the fourth gas inlet 37 and, at the same time, the second gas inlet/gas outlet 30 is connected to the third gas inlet/gas outlet 36. The pressure build-up valve 13 and the flaps 10, 11, 15 are closed. The pressure dissipation valve 16 is open, such that the pressure in the first adsorber 2 is dissipated. The fresh air L is supplied to the second adsorber 3 via the lines 6 and 6b, and is drawn off via the lines 7b and 7.

Figure 8:
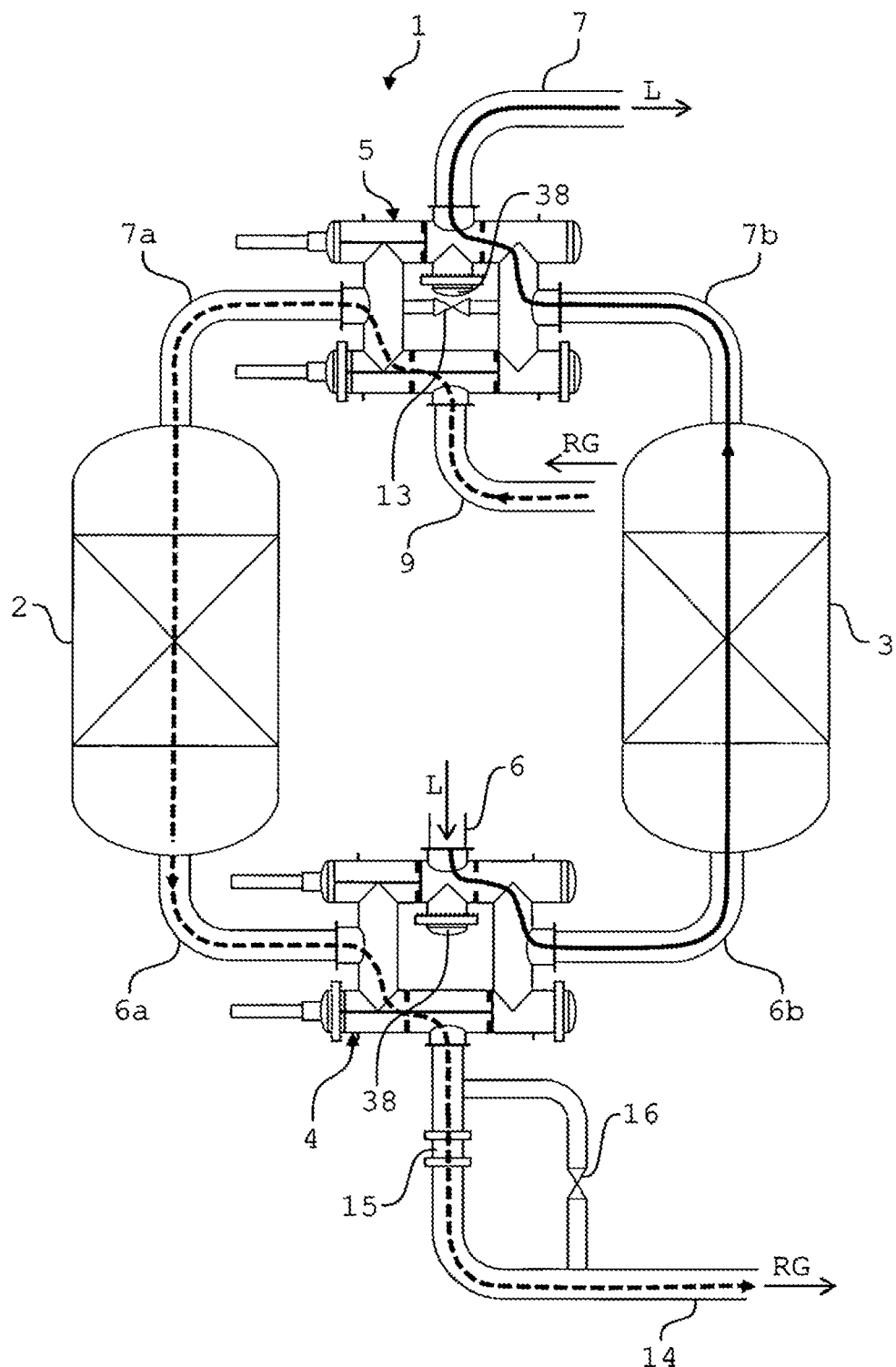
FIG. 8 shows a further schematic sectional view of the adsorber station as per FIG. 1.

In FIG. 8, the first adsorber 2 is in the regeneration phase, and the second adsorber 3 is in the adsorption phase. This means that the switchover of the adsorbers 2, 3 is complete. The flaps 10, 11 and 15 are open. The pressure build-up valve 13 is closed, and the pressure dissipation valve 16 is either open or closed. The fresh air L is supplied to the second adsorber 3 via the lines 6 and 6b, and is drawn off via the lines 7b and 7. The regeneration gas RG is supplied to the first adsorber 2 via the lines 9 and 7a, and is drawn off via the lines 6a and 14.

Figure 9:
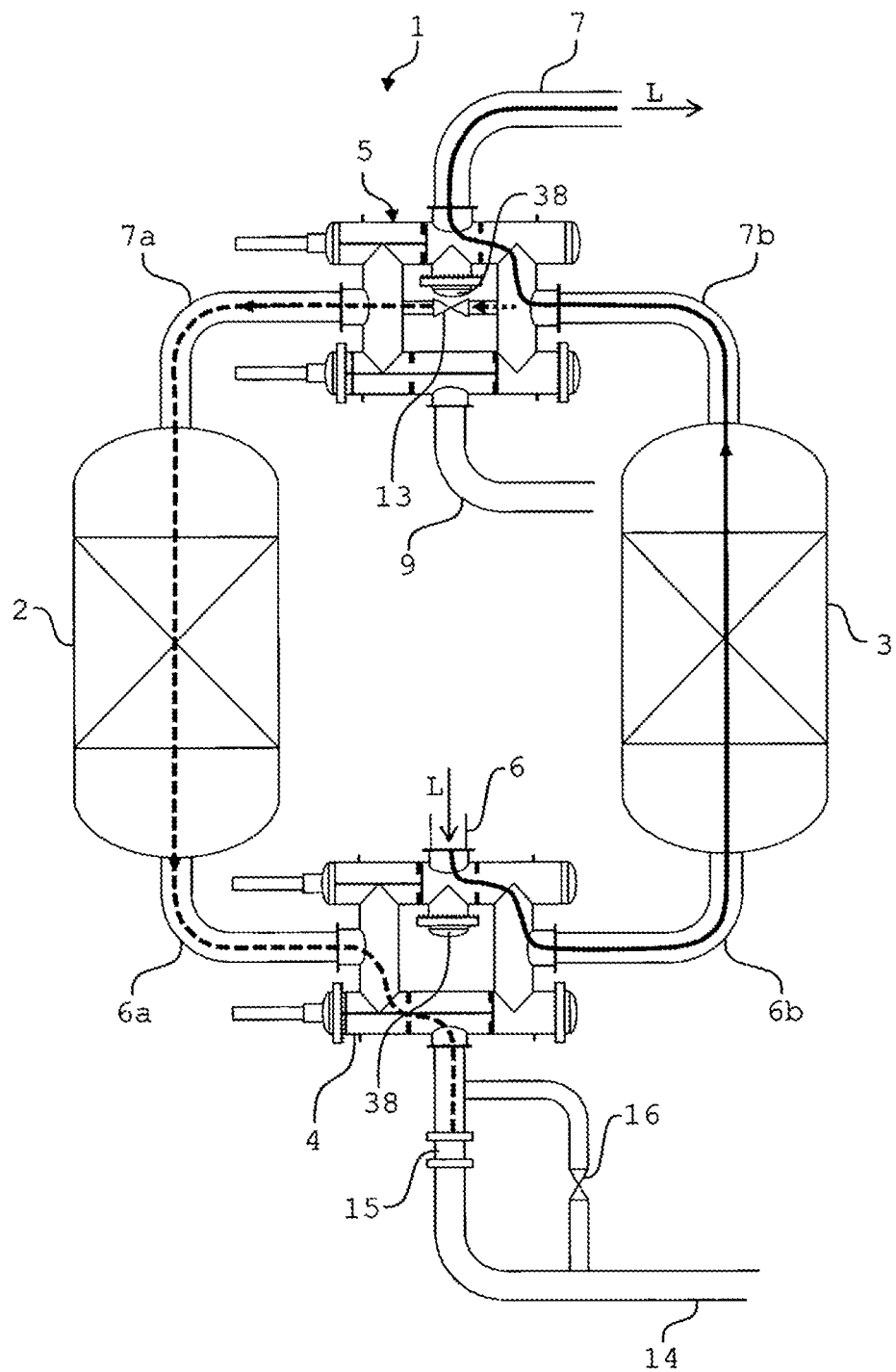
FIG. 9 shows a further schematic sectional view of the adsorber station as per FIG. 1.

FIG. 9 shows the adsorber station 1 again during the switchover of the adsorbers 2, 3, wherein the first adsorber 2 is being switched into the adsorption phase and the second adsorber 3 is being switched into the regeneration phase. Here, both valve arrangements 4, 5 have been switched into the first switching state. The flaps 10, 11 and 15 and the pressure dissipation valve 16 are closed. The pressure build-up valve 13 is open in order to realize a build-up of pressure in the first adsorber 2. In this way, a pressure shock upon the switchover of the adsorbers 2, 3 is prevented.

By means of the valve arrangements 4, 5, it is possible for the adsorbers 2, 3 to be switched over without an interruption in the inflow of fresh air. This means that the fresh air L can be supplied continuously to the adsorber station 1 even during the switchover of the adsorbers 2, 3. Owing to the use of the switchable valve arrangements 4, 5, the adsorber station 1 can be constructed with considerably fewer lines, flaps and valves in relation to known adsorber stations. Owing to the reduced number of flaps and valves and owing to the simplified pipework, a cost saving is realized. The actuation for the switchover of the adsorbers 2, 3 is likewise simplified owing to the relatively low number of valves and flaps. The simplified construction of the adsorber station 1 also results in reduced maintenance outlay and a reduction in material expenditure.

Figure 10:
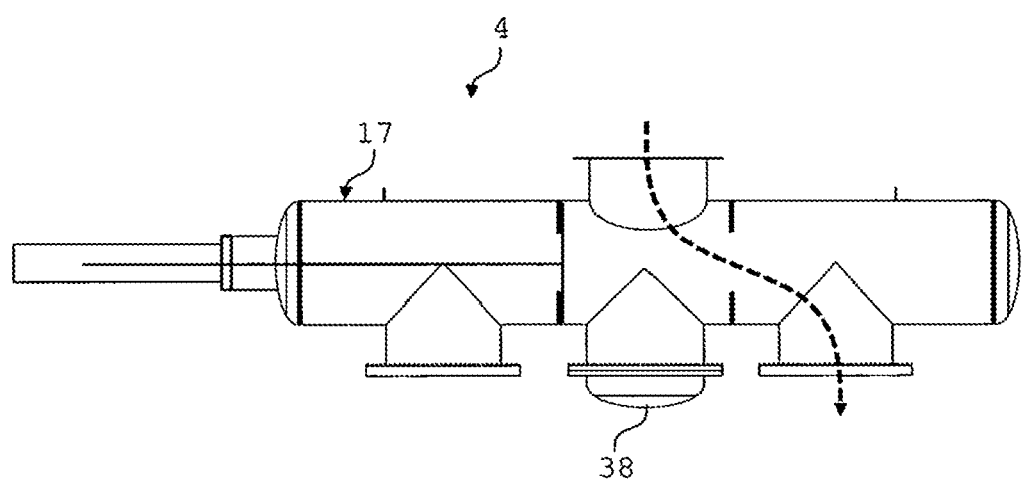
FIG. 10 shows a schematic sectional view of a further embodiment of a valve arrangement for the adsorber station as per FIG. 1.

FIG. 10 shows a further embodiment of a valve arrangement 4. The valve arrangement 4 as per FIG. 10 differs from the valve arrangement 4 as per FIGS. 2 and 3 merely in that the valve arrangement 4 has only one valve device 17. The valve arrangement 4 as per FIG. 10 may also be referred to as a two-way switch. The flaps 10, 11 can be replaced by means of the valve arrangement 4 as per FIG. 10.

Although the present invention has been described using exemplary embodiments, it can be modified in various ways.

REFERENCE SIGNS USED

1 Adsorber station
2 Adsorber
3 Adsorber
4 Valve arrangement
5 Valve arrangement
6 Line
6a Line
6b Line
7 Line
7a Line
7b Line
8 Line
8a Line
8b Line
9 Line
10 Flap
11 Flap
12 Heating device
13 Pressure build-up valve
14 Line
15 Flap
16 Pressure dissipation valve 17 Valve device
18 Valve device
19 Housing section
20 Housing section
21 Connecting piece
22 Connecting piece
23 Valve housing
24 Gas inlet/gas outlet
25 Valve body
26 Actuating rod
27 Tube portion
28 Valve seat
29 Valve seat
30 Gas inlet/gas outlet
31 Valve body
32 Valve body
33 Actuating rod
34 Valve seat
35 Valve seat
36 Gas inlet/gas outlet
37 Gas inlet/gas outlet
38 Maintenance opening
39 Tube portion
40 Air separation plant
L Fresh air
$L_{19}$ Longitudinal direction
$L_{20}$ Longitudinal direction
$P_L$ Pressure
RG Regeneration gas

The invention claimed is:

1. A valve arrangement (4, 5) for an adsorber station (1) of an air separation plant (40), comprising:
a first valve device (17) comprising a first gas inlet/gas outlet (24), a first housing section (19), and a first valve body (25) which is linearly displaceable in a first longitudinal direction ($L_{19}$) of the first housing section (19),
a second valve device (18) comprising a second gas inlet/gas outlet (30), a second housing section (20), and a second valve body (31) which is linearly displaceable in a second longitudinal direction ($L_{20}$) of the second housing section (20),
a first connecting piece (21), which fluidically connects the first housing section (19) of the first valve device (17) to the second housing section (20) of the second valve device (18), and
a second connecting piece (22), which fluidically connects the first housing section (19) of the valve first device (17) to the second housing section (20) of the second valve device (18),
wherein the valve devices (17, 18) or the housing sections (19, 20) are arranged parallel to one another and spaced apart from one another, and the first longitudinal direction ($L_{19}$) is orientated parallel to the second longitudinal direction ($L_{20}$),
wherein the first connecting piece (21) has a third gas inlet/gas outlet (36),
wherein the second connecting piece (22) has a fourth gas inlet/gas outlet (37), and
wherein the valve arrangement (4, 5) is selectively switchable between:
a first switching state, in which the first gas inlet/gas outlet (24) is fluidically connected to the fourth gas inlet/gas outlet (37) and the second gas inlet/gas outlet (30) is simultaneously fluidically connected to the third gas inlet/gas outlet (36), and
a second switching state, in which the first gas inlet/gas outlet (24) is fluidically connected to the third gas inlet/gas outlet (36) and the second gas inlet/gas outlet (30) is simultaneously fluidically connected to the fourth gas inlet/gas outlet (37).

2. The valve arrangement as claimed in claim 1, wherein the valve arrangement (4, 5) is switchable into a third switching state, in which the first gas inlet/gas outlet (24), the second gas inlet/gas outlet (30), the third gas inlet/gas outlet (36) and the fourth gas inlet/gas outlet (37) are simultaneously fluidically connected to one another.

3. The valve arrangement as claimed in claim 1, further comprising a pressure build-up valve (13) which is arranged between the first connecting piece (21) and the second connecting piece (22) and which serves for the equalization of pressure between the first connecting piece (21) and the second connecting piece (22).

4. The valve arrangement as claimed in claim 1, wherein the first valve device (17) and the second valve device (18) are switchable simultaneously, such that the first valve device (17) and the second valve device (18) are simultaneously switchable back and forth between the first switching state and the second switching state.

5. The valve arrangement as claimed in claim 1, wherein the first valve device (17) further comprises a first valve seat (28) and a second valve seat (29), and the first valve body (25) is arranged between the first valve seat (28) and the second valve seat (29), and wherein the first valve body (25) bears against the first valve seat (28) in the first switching state and against the second valve seat (29) in the second switching state.

6. The valve arrangement as claimed in claim 5, wherein the first gas inlet/gas outlet (24) is arranged between the first valve seat (28) and the second valve seat (29).

7. The valve arrangement as claimed in claim 5, wherein the first valve seat (28) and the second valve seat (29) are ring-shaped, and the first valve body (25) is disk-shaped.

8. The valve arrangement as claimed in claim 5, wherein the first valve body (25) is, with the aid of fresh air (L) supplied by the valve arrangement (4, 5), pressable against the first valve seat (28) in the first switching state and against the second valve seat (29) in the second switching state.

9. The valve arrangement as claimed in claim 1, wherein the second valve device (18) further comprises a valve seat (34), a further valve seat (35), and a third valve body (32), wherein the valve seat (34) and the further valve seat (35) are arranged between the second valve body (31) and the third valve body (32), wherein the third valve body (32) bears against the further valve seat (35) in the first switching state and wherein the second valve body (31) bears against the further valve seat (34) in the second switching state.

10. The valve arrangement as claimed in claim 9, wherein the second gas inlet/gas outlet (30) is arranged between the valve seat (34) and the further valve seat (35).

11. The valve arrangement as claimed in claim 9, wherein the valve seat (34) and the further valve seat (35) are ring-shaped, and the second valve body (31) and the third valve body (32) are disk-shaped.

12. The valve arrangement as claimed in claim 9, wherein the third valve body (32) is, with the aid of fresh air (L) supplied by the valve arrangement (4, 5), pressable against the further valve seat (35) in the first switching state, and wherein the second valve body (31) is pressable against the valve seat (34) in the second switching state.

13. The valve arrangement as claimed in claim 9, wherein the second valve body (31) and the third valve body (32) are jointly axially displaceable in the second housing section (20) along the longitudinal direction ($L_{20}$) thereof.

14. An adsorber station (1) for an air separation plant (40), having a first adsorber (2), having a second adsorber (3) and having at least one valve arrangement (4, 5) as claimed in claim 1, wherein the first adsorber (2) and the second adsorber (2) are switchable by means of the at least one valve arrangement (4, 5) between an adsorption phase and a regeneration phase.

15. The valve arrangement as claimed in claim 5, wherein the second valve device (18) comprises a third valve seat (34), a fourth valve seat (35), and a third valve body (32), wherein the third valve seat (34) and the fourth valve seat (35) are arranged between the second valve body (31) and the third valve body (32), wherein the third valve body (32) bears against the fourth valve seat (35) in the first switching state and wherein the second valve body (31) bears against the fourth valve seat (34) in the second switching state.

16. The valve arrangement as claimed in claim 15, wherein the first gas inlet/gas outlet (24) is arranged between the first valve seat (28) and the second valve seat (29), and the second gas inlet/gas outlet (30) is arranged between the third valve seat (34) and the fourth valve seat (35).

17. The valve arrangement as claimed in claim 15, wherein the first valve body (25) is, with the aid of fresh air (L) supplied by the valve arrangement (4, 5), pressable against the first valve seat (28) in the first switching state and against the second valve seat (29) in the second switching state, and the third valve body (32) is, with the aid of fresh air (L) supplied by the valve arrangement (4, 5), pressable against the fourth valve seat (35) in the first switching state, and wherein the second valve body (31) is pressable against the third valve seat (34) in the second switching state.

18. The valve arrangement as claimed in claim 15, wherein the second valve body (31) and the third valve body (32) are jointly axially displaceable in the second housing section (20) along the longitudinal direction ($L_{20}$) thereof.

19. A valve arrangement comprising:
- a first valve device comprising a first gas inlet/gas outlet and a first housing section,
- a second valve device comprising a second gas inlet/gas outlet and a second housing section,
- a first connecting piece, which fluidically connects the first housing section of the first valve device to the second housing section of the second valve device, and
- a second connecting piece, which fluidically connects the first housing section of the first valve device to the second housing section of the second valve device,
- wherein the valve devices or the housing sections are arranged parallel to one another and spaced apart from one another,
- wherein the first valve device can be operated independently of the second valve device, and the second valve device can be operated independently of the first valve device,
- wherein the first connecting piece has a third gas inlet/gas outlet, wherein the second connecting piece has a fourth gas inlet/gas outlet, and
- wherein the valve arrangement is selectively switchable between:
  - a first switching state, in which the first gas inlet/gas outlet is fluidically connected to the fourth gas inlet/gas outlet and the second gas inlet/gas outlet is simultaneously fluidically connected to the third gas inlet/gas outlet, and
  - a second switching state, in which the first gas inlet/gas outlet is fluidically connected to the third gas inlet/gas outlet and the second gas inlet/gas outlet is simultaneously fluidically connected to the fourth gas inlet/gas outlet.

* * * * *